Figure 1:
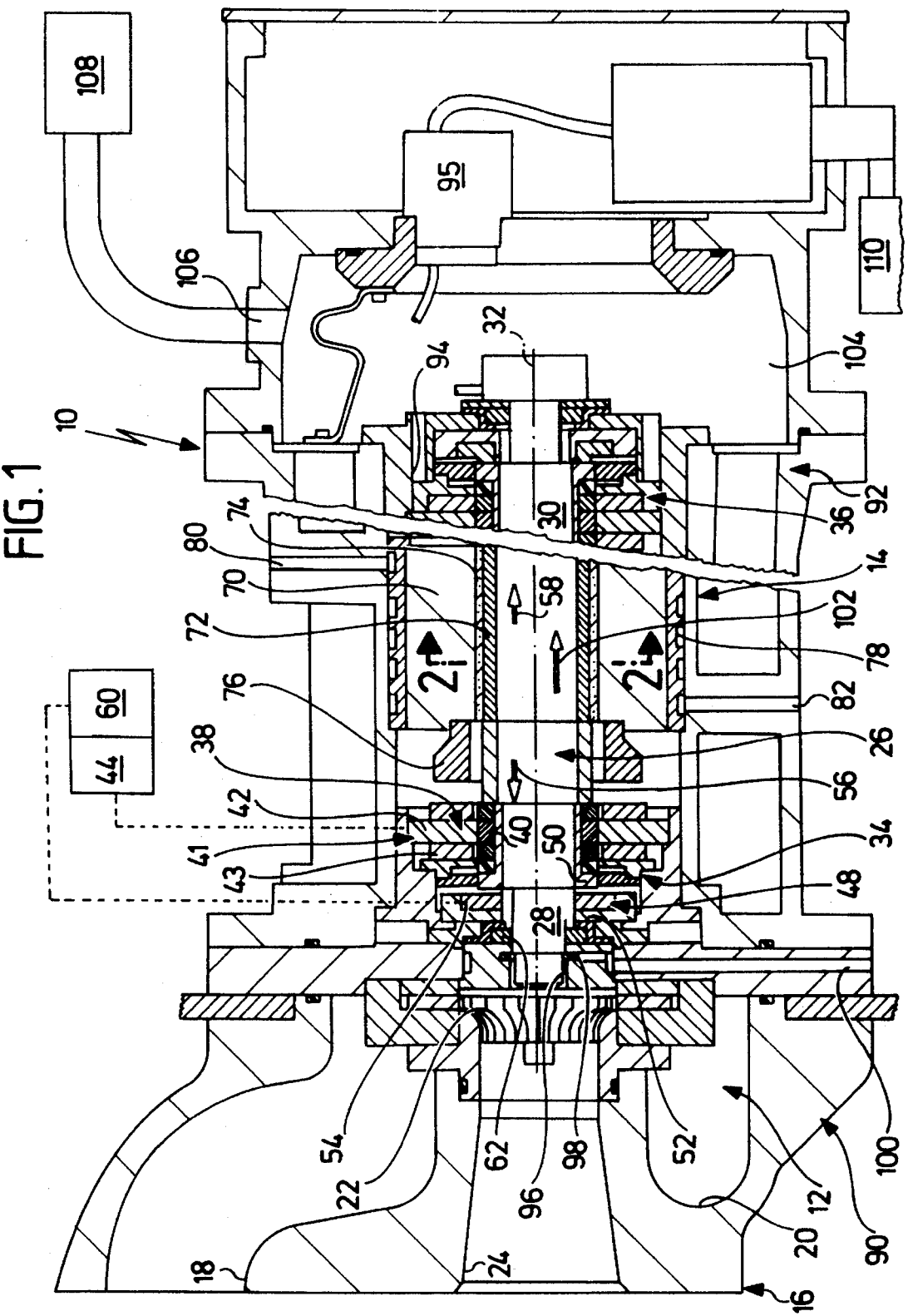

United States Patent [19]
Canders et al.

[11] Patent Number: 5,481,145
[45] Date of Patent: Jan. 2, 1996

[54] POWER RECOVERY PLANT

[75] Inventors: Wolf-Ruediger Canders; Norbert Ueffing, both of Osterode; Klaus Reuter, Grenzach-Wyhlen, all of Germany

[73] Assignees: Anton Piller GmbH & Co. KG, Osterode am Harz, Germany; BOC AG, Basel, Switzerland

[21] Appl. No.: 94,853

[22] Filed: Jul. 20, 1993

[30] Foreign Application Priority Data

Nov. 18, 1992 [DE] Germany .................. 9215696 U

[51] Int. Cl.⁶ .................................................. H02K 7/09
[52] U.S. Cl. .................. 310/90.5; 310/60 R; 324/207.25
[58] Field of Search ................ 310/90.5, 58, 59, 310/61–63; 417/365, 405; 324/207.25

[56] References Cited

U.S. PATENT DOCUMENTS

| | | | |
|---|---|---|---|
| 4,694,654 | 9/1987 | Kawamura | 60/605 |
| 4,924,674 | 5/1990 | Hara et al. | 60/608 |
| 4,929,158 | 5/1990 | Girault | 417/405 |
| 5,083,040 | 1/1992 | Whitford | 290/52 |
| 5,121,605 | 6/1992 | Oda et al. | 60/608 |
| 5,126,612 | 6/1992 | Girault | 310/90.5 |
| 5,220,232 | 6/1993 | Rigney, II et al. | 310/90.5 |
| 5,310,311 | 5/1994 | Andres et al. | 415/229 |
| 5,380,170 | 1/1995 | Fain | 310/58 |

FOREIGN PATENT DOCUMENTS

| | | |
|---|---|---|
| 0009843 | 4/1980 | European Pat. Off. . |
| 462724 | 12/1991 | European Pat. Off. . |
| 2336550 | 7/1977 | France . |
| 2010805 | 9/1971 | Germany . |
| 2515315 | 10/1976 | Germany . |
| 2544726 | 4/1977 | Germany . |
| 2658687A1 | 7/1977 | Germany . |
| 2658687B2 | 7/1977 | Germany . |
| 2823261 | 11/1979 | Germany . |
| 4105258 | 8/1992 | Germany . |
| 344128 | 3/1960 | Switzerland . |
| 641839 | 9/1981 | U.S.S.R. . |
| 1491710 | 11/1977 | United Kingdom . |

OTHER PUBLICATIONS

Japanese Patent Abstract No. 63-277443, Application No. 62-111300, *Patent Abstracts of Japan*.
"Suspending Rotating Shafts in Midair," *Compressed Air*, Bd. 90, No. 4, Apr. 1, 1985, Washington, U.S.A., pp. 30–33.

*Primary Examiner*—Steven L. Stephan
*Assistant Examiner*—D. R. Haszko
*Attorney, Agent, or Firm*—Barry R. Lipsitz

[57] ABSTRACT

In order to provide a power recovery plant comprising a gas turbine with a turbine wheel and a generator with a rotor driven by the turbine wheel, in which the known bearing problems are diminished or even cease, it is suggested that the turbine and the generator be combined in a plant housing to form one unit, that the turbine wheel and the rotor form a rotor unit rotating as a whole and that the rotor unit be rotatably mounted in the plant housing by magnetic bearing units in a non-contact manner.

27 Claims, 2 Drawing Sheets

Patent 5,481,145

POWER RECOVERY PLANT

The invention relates to a power recovery plant, comprising a gas turbine with a turbine wheel and a generator with a rotor driven by the turbine wheel.

In the power recovery plants known so far, which are used, for example, in the expansion of cryogas or natural gas to recover the energy released during the expansion of the gases, a turbine and a generator driven by but separate from this turbine are used.

Since the turbine operates at high rotational speeds and, moreover, high temperature gradients must be possible, problems occur in the region of the bearings of the known plants, in particular due to friction and/or leakage and/or soiling of the gas flowing through the gas turbine.

The object underlying the invention is, therefore, to create a power recovery plant, in which the known bearing problems are diminished or even cease.

This object is accomplished according to the invention, in a power recovery plant of the type described at the outset, in that the turbine and the generator are combined in a plant housing to form one unit, that the turbine wheel and the rotor form a rotor unit rotating as a whole and that the rotor unit is rotatably mounted in the plant housing by magnetic bearing units in a non-contact manner.

The advantage of the inventive solution is, therefore, to be seen in the fact that a simple construction is possible by combining turbine wheel and rotor to form a rotor unit rotating as a whole and that the friction losses are decisively reduced due to the use of magnetic bearing units for mounting the rotor unit. This means that high rotational speeds are possible without any problem and, in addition, no soiling of the process gas driving the gas turbine occurs due to lubricants or soiled substances exiting from the bearings.

In principle, it is possible to support the rotor unit by having the rotor unit mounted by two magnetic bearing units arranged in axially spaced relation to one another.

It is especially favorable, in particular for high rotational speeds, for the rotor unit, when viewed axially, to be mounted on both sides of the rotor by means of one respective magnetic bearing unit.

In this case, one magnetic bearing unit is advantageously arranged between the rotor and the turbine wheel so that the turbine wheel is seated on one end of the rotor unit which protrudes freely beyond this magnetic bearing unit.

No exact details have so far been given concerning the design of the magnetic bearing units. For example, in one advantageous embodiment each magnetic bearing unit comprises at least one magnetic radial bearing.

In order to achieve, in addition, an axial mounting of the rotor unit, it is possible to associate a magnetic axial bearing with one of the magnetic bearing units.

For reasons of a compact construction, it is, however, even more advantageous for each magnetic bearing unit to mount the rotor unit magnetically against any movement of the rotor in respectively opposite axial directions, i.e. each magnetic bearing unit comprises half of a magnetic axial bearing.

No exact details have so far been given regarding the type of magnetic mounting. It is, for example, particularly favorable for the magnetic mounting by the magnetic bearing units to represent an active magnetic mounting.

In this respect, a positioning control with sensors is preferably provided for the active magnetic mounting and this control guides the rotor unit in a specific position.

The mounting, in particular, in the case of the magnetic radial bearings is designed such that by controlling the stator of the radial bearings an axis of rotation of the rotor unit is determinable.

In order to realize the high rotational speeds, it is particularly advantageous for the positioning control to select the axis through center of gravity or neutral axis as axis of rotation for the rotor unit above a specific rotational speed.

In order to obtain an advantageous mounting at low rotational speeds, as well, it is, in addition, expedient for the positioning control to also control the rotor such that below the specific rotational speed the axis of rotation is a geometrical axis of the rotor.

No exact details have so far been given regarding the design of the radial bearings. For example, in an advantageous embodiment the radial bearing comprises stacks of sheets shrunk onto a shaft of the rotor unit and a frame arranged in the plant housing.

With respect to the design of the axial bearings, it is advantageous for these to comprise a ferromagnetic disk seated on a shaft of the rotor unit and a frame arranged in the plant housing.

In order to ensure that the generator is not destroyed when the magnetic bearing units are switched off or upon failure of the magnetic bearing units, it is advantageous for the rotor unit to be mounted in addition by pick-up or catching bearings which are effective upon failure of the magnetic bearing unit. These catching bearings are preferably mechanical bearings which are designed either as ball bearings or as friction bearings.

Furthermore, the catching bearings preferably effect a radial and axial mounting of the rotor unit, as well, when this extends in the catching bearings and not in the magnetic bearings.

No details have been given in the above regarding the design of the plant housing. For example, in a preferred embodiment the plant housing encloses a turbine interior of the turbine and a generator interior of the generator so that they are gas-tight.

With such a design of the plant housing, it is possible to cope with leakages, in particular, of the process gas in a particularly favorable manner since leakage gas entering the generator interior cannot flow off in an uncontrolled manner.

It is, in addition, particularly advantageous for the plant housing, apart from the turbine interior, to also enclose the generator interior so that this is resistant to pressure and gas-tight. In this way, it is possible to maintain the gas present in the generator interior at defined pressure ratios and to reduce the gas friction by corresponding reduction of the pressure at the required high rotational speeds.

In a particularly advantageous solution, a connecting passage penetrated by the rotor unit leads from the generator interior to the turbine interior; and the generator interior, the connecting passage and the turbine interior are enclosed by the plant housing so as to be gas-tight and resistant to pressure. In this case, the turbine interior forms with the connecting passage and the generator interior a unit which, as such, is enclosed so as to be gas-tight and resistant to pressure. This means that, on the one hand, no problems occur with a flow of leakage gas from the turbine interior into the generator interior and, on the other hand, defined pressure ratios can be set in the generator interior to reduce the gas friction and either suppress the flow of leakage gas from the turbine interior into the generator interior by corresponding pressure or draw off the leakage gas flowing from the turbine interior into the generator interior in a defined manner.

This construction of the inventive solution, in particular, complements advantageously with the use of the magnetic bearing units since gas flowing from the gas turbine into the generator and, in particular, into the generator interior does not become soiled by the bearings either in the region of the mounting of the turbine wheel or in the region of the mounting of the rotor and, in addition, the aforementioned advantages result.

In order to draw off heat occurring in the region of the magnetic bearing units due to the high rotational speeds, it is advantageous for the magnetic bearing units to have a cooling gas flowing through them.

Purely theoretically, the cooling gas could flow through the magnetic bearing units in different directions. It is particularly favorable for the cooling gas to flow through the magnetic bearing units essentially in axial direction.

The cooling of the magnetic bearing units may be effected even more advantageously when the generator interior has a cooling gas flowing through it, whereby this cooling gas advantageously flows through the generator interior in a region surrounding the rotor unit and thus flows along the surfaces of the corresponding sections of the rotor unit.

In principle, any optional gas can be used as cooling gas. It is, however, particularly advantageous for the cooling gas to be identical to the process gas driving the turbine as, in this case, a flow of leakage gas through the connecting passage does not cause any problems whatsoever and, in particular, no soiling whatsoever in the process gas.

The cooling gas used to cool the magnetic bearing units can be of the most varied origin. In the simplest case, the cooling gas originates from the flow of process gas through the turbine.

This can, for example, be achieved in that the cooling gas is the leakage gas flowing from the turbine interior into the generator interior through the connecting passage.

This leakage gas can, for example, then be collected in the generator interior in a region remote from the gas turbine and removed.

In order to bring about a defined cooling of the magnetic bearing units, and, in particular, in the case where the leakage gas coming from the turbine interior does not have an adequate cooling effect as this has, for example, been heated up prior to flowing into the gas turbine, external cooling gas is supplied for cooling the magnetic bearing units and removed again.

The external cooling gas may be guided through the magnetic bearing units and, where necessary, through the generator interior, as well, in various different ways. For example, it would, in principle, be possible to have the cooling gas flowing in axial direction either towards the gas turbine or away from the gas turbine.

In the particular case where the external cooling gas is intended to serve to supplement the cooling effect of the leakage gas, it is, however, advantageous for the external cooling gas to flow through the magnetic bearing units in axial direction away from the turbine.

In a particularly advantageous solution, the external cooling gas is supplied between the turbine wheel and the magnetic bearing unit located closest to the turbine wheel and flows through the generator interior in axial direction away from the turbine.

In this case, it is then advantageous for the cooling gas to be removable from the generator interior on a side remote from the turbine.

In this respect, it is particularly advantageous for the cooling gas to be suppliable in the region of the connecting passage.

In order to keep the flow of leakage gas as small as possible in the case of too high a temperature of the stream of leakage gas flowing from the turbine interior into the generator interior, it is advantageous for a gas-flow reducing element to be arranged in the connecting passage.

This gas-flow reducing element is, for example, designed as a non-contact seal, preferably as a labyrinth seal.

As already mentioned in the above, it is advantageous to keep the generator interior at a defined pressure level in order to reduce the gas friction in the generator interior.

In this respect, the pressure level in the generator interior is preferably selected such that it is below the pressure at a gas inlet of the turbine.

In a particularly favorable solution, the pressure level in the generator interior corresponds to a pressure level at a gas outlet of the turbine.

In order to generate as little heat as possible in the generator, which then has to be removed again from the generator interior, it is advantageous for the generator to be a permanently excited synchronous generator.

In this respect, it is particularly expedient for the rotor to be an electrically passive rotor so that no power supplies have to be passed to the rotor but merely to a stator of the generator.

In order to be able to remove the heat also occurring in the stator in an optimum manner, it is preferable for the stator to be cooled. For example, the stator could also be cooled by cooling gas which flows expediently through cooling gas passages provided in the stator. It is, however, even more advantageous, particularly on account of better thermal couplings, for the stator to be liquid-cooled.

The inventive power recovery plant may be used particularly advantageously when a frequency converter for generating a customary standardized supply voltage with a standardized supply frequency for a public power supply network is connected to the outlet of the generator. Due to the rotor seated on the rotor unit, the generator generates an alternating-current voltage having a frequency which alternates considerably and corresponds to the rotational speed of the rotor unit and which is not suitable for feeding into a public power supply.

Moreover, in a particularly advantageous field of use of the inventive power recovery plant, the turbine is an expansion turbine in order to recover the energy released during the expansion of gases. This can, for example, concern the expansion of natural gas in long-distance pipelines or the expansion of gas in cryotechnology.

Additional features and advantages are the subject matter of the following description as well as of the drawings of one embodiment.

Figure 2:
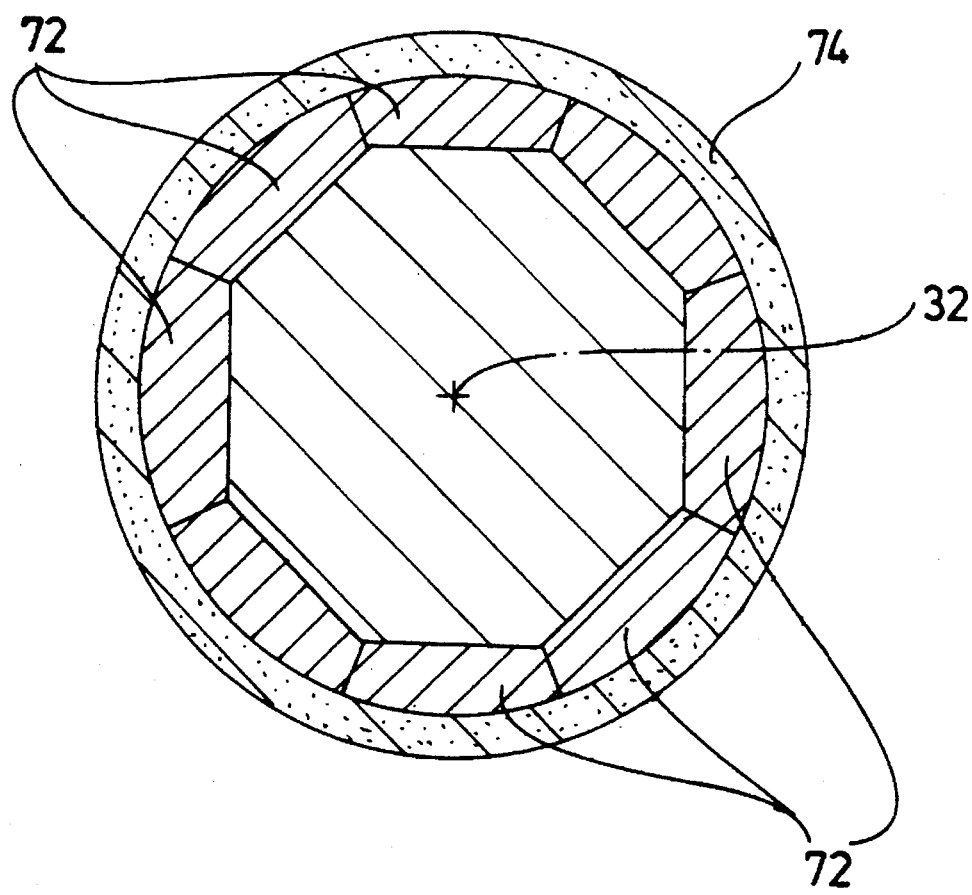

In the drawings:

FIG. 1 shows a schematic longitudinal section through an inventive power recovery plant and FIG. 2 shows a section through a rotor along line 2—2.

An embodiment of an inventive power recovery plant, illustrated in FIG. 1, comprises a plant housing designated as a whole as 10, in which a gas turbine 12 and a generator 14 are combined to form one unit.

The gas turbine 12 comprises a turbine housing 16 which is designed as a gas expansion turbine and comprises an inlet passage 18 for the process gas to be expanded. This passage leads to an interior space 20 of the gas turbine, in which a turbine wheel 22 is rotatably arranged. An outlet passage 24, in which the expanded gas flows away, leads away from this turbine interior 20.

The turbine wheel 22 is part of a rotor unit designated as a whole as 26. This rotor unit comprises a shaft 28 bearing the turbine wheel 22 and a rotor 30 of the generator 14 seated on the shaft 28. When the turbine wheel 22 is driven, the entire rotor unit 26 is caused to rotate and, therefore, the rotor 30 of the generator 14 is also rotatingly driven about an axis of rotation 32 at the rotational speed of the turbine wheel 22.

The rotor unit 26 is hereby mounted in the plant housing 10 in a non-contact manner by two magnetic bearing units 34, 36 arranged in spaced relation to one another in the direction of the axis of rotation 32, whereby the magnetic bearing units 34 and 36 are arranged on both sides of the rotor 30, when seen in the direction of the axis of rotation 32.

Each of the magnetic bearing units 34, 36 comprises a magnetic radial bearing 38 which has, on the one hand, an annular stack of sheets 40 shrunk onto the shaft 28 and, on the other hand, a frame 41 with a stator 42 of coated electrical sheets, the poles of which are encircled by coils 43. Electromagnetically, each stator 42 is divided into 4 quadrants each having a north and south pole so that each radial bearing 38 comprises two active axes, each of which is formed by two opposite quadrants. The weight forces acting on the rotor unit 26 are absorbed by the two upper quadrants of each radial bearing 38 since this radial bearing can only produce attraction forces.

In addition, each radial bearing 38 comprises a sensor ring which is not illustrated in the drawing of FIG. 1 and the signals of which are evaluated by a positioning control 44, which controls the axes such that the rotor 26 rotates about the predetermined axis of rotation 32.

Apart from the radial bearing 38, each magnetic bearing unit 34, 36 comprises half 48 of an axial bearing, whereby each half 48 of the axial bearing comprises a ferromagnetic disk 50 seated on the shaft 28 and a frame 52 seated in the plant housing 10. The windings of an electromagnetic coil 54 are let into this frame.

Each half 48 of the axial bearing operates such that attraction forces are exerted on the ferromagnetic disk 50 by the frame 52 and these act upon the ferromagnetic disk 50 with a force in the direction of the frame 52.

The respective halves 48 of the axial bearings are arranged in the magnetic bearing units 34 and 36 such that they exert oppositely acting axial forces 56 and 58, respectively, on the rotor unit 26 and therefore stabilize the rotor unit, whereby the two halves 48 of the axial bearings also each have sensors and are controlled via a common positioning control 60.

Each of the magnetic bearing units 34 and 36 is, in addition, provided with a respective catching bearing 62, whereby the catching bearing 62 is designed each time as a radial and axial bearing and serves to pick up or catch the rotor unit 26 when the magnetic bearing units 34, 36 are switched off or fail and to prevent collisions, for example, in the gas turbine 12 or the generator 14.

The positioning controls 44 of the radial bearings 38 of the magnetic bearing units 34 and 36 are, in addition, preferably designed such that they mount the rotor unit 26 for rotation about its geometric center axis as axis of rotation 32 below a predetermined rotational speed. When the predetermined rotational speed is exceeded, the rotor unit 26 is mounted about the neutral axis as axis of rotation 32 so that, in this state, the rotor unit 26 can be mounted in a more or less force-free and self-centering manner.

The generator 14 comprises, apart from the rotor 30, a stator 70 and is designed as a permanently excited synchronous generator, whereby the rotor is electrically passive and, as illustrated in FIG. 2, bears high-energy magnets 72 seated on the shaft 28 and arranged as segments. These magnets are secured radially to the axis of rotation 32 by a binding 74.

For cooling the stator 70, which bears for its part coil windings 76, the stator 70 is provided with cooling passages 78 extending in the stator 70 around the axis of rotation 32. These passages are connected with a cooling water supply line 80 and a cooling water removal line 82 and therefore having cooling water flowing through them.

The plant housing 10 forms with a first section 90 a turbine housing for the gas turbine 12 and surrounds the turbine interior 20 so as to make it gas-tight and resistant to pressure.

Moreover, the plant housing 10 forms with a second section a generator housing 92 which encircles a generator interior 94 likewise to make it resistant to pressure and gas-tight. The stator 70, the rotor 30 as well as the magnetic bearing units 34 and 36 are arranged in this generator interior 94. All the electric supply lines leading into the generator interior are guided through pressure-resistant cable bushings 95.

Furthermore, a connecting passage 96 leads from the generator interior 94 to the turbine interior 20, whereby the shaft 28 of the rotor unit extends through this connecting passage 96 and bears the turbine wheel 22 on its free end extending into the turbine interior 20.

In this respect, the turbine interior 20 forms with the generator interior 94, via the connecting passage 96, a chamber which is closed so as to be gas-tight and resistant to pressure and in which the rotor unit 26 rotates in a non-contacting manner during operation of the power recovery plant.

In order to throttle a flow of leakage gas from the turbine interior 20 into the generator interior 94, a labyrinth seal 98 is provided in the connecting passage 96 so that only a slight proportion of the process gas flows from the turbine interior 20 into the generator interior 94.

In the simplest case, the flow of leakage gas entering the generator interior 94 from the turbine interior 20 serves as cooling gas which flows through the generator interior 94 in axial direction away from the gas turbine 12, thereby flows around the rotor unit 26 and cools the magnetic bearing units 34, 36.

A cooling gas inlet channel 100 is provided for additional or alternative cooling of the magnetic bearing units 34, 36. This channel opens between the labyrinth seal 98 and the magnetic bearing unit 34 facing the turbine wheel 22 and allows cooling gas to flow onto the rotor unit 26 in this region. This cooling gas flows, first of all, through the magnetic bearing unit 34 essentially in axial direction 102, then through a gap between the rotor 30 and the stator 70 and, finally, through the magnetic bearing unit 36, likewise in axial direction 102 away from the gas turbine 12, and collects, like the flow of leakage gas as well, in a rearward section 104 of the generator interior 94. From here, it is removed via a cooling gas outlet channel 106 and supplied to a gas return line 108 which supplies the cooling gas to the cooling gas inlet channel 100 again.

Preferably, the same gas as the process gas driving the gas turbine 12 is used as cooling gas so that superfluous cooling gas can be supplied back to the process gas. Moreover, process gas entering the generator interior 94 from the turbine interior 20 is not subjected to any soiling whatsoever but, on the contrary, the leakage gas entering the generator interior 94 from the turbine interior 20 is likewise used as cooling gas, the cooling effect of which is facultatively supplemented by the cooling gas externally supplied via the cooling gas inlet channel.

The cooling gas is preferably supplied such that a pressure prevails in the generator interior which corresponds approximately to the pressure of the process gas in the outlet channel 24 in order to keep the gas friction in the generator interior as low as possible.

The current generated by the permanently excited synchronous generator is, finally, supplied to a frequency converter 110, which converts this into an alternating current having a supply frequency and a supply voltage which allow it to be fed into a public power supply network.

The present disclosure relates to the subject matter disclosed in German application No. G 92 15 696.7 of Nov. 18, 1992, the entire specification of which is incorporated herein by reference.

What is claimed is:

1. A power recovery plant comprising:

a plant housing, a gas expansion turbine connected to a long distance pipeline for gas, said gas expansion turbine having a radially outer inlet passage, a central outlet passage and a turbine wheel driven by said gas when flowing from said inlet passage to said outlet passage, an electric generator having a rotor driven by said turbine wheel, said rotor and said turbine wheel forming a rotor unit rotating as a whole within said plant housing, said rotor unit being rotatably mounted within said plant housing by magnetic bearings, one of said magnetic bearings supporting said rotor unit radially between said turbine wheel and said rotor and another of said magnetic bearings supporting said rotor unit at the opposite side of said rotor, said magnetic bearings and said rotor being arranged in a coherent interior space of said plant housing, said interior space enclosing a gas at a defined pressure level.

2. The power recovery plant as defined in claim 1, wherein a magnetic axial bearing is associated with at least one of the magnetic bearing units.

3. The power recovery plant as defined in claim 1, wherein each magnetic bearing unit magnetically mounts the rotor unit against movement of the rotor in respectively opposite axial directions.

4. The power recovery plant as defined in claim 3, wherein the axial bearing comprises a ferromagnetic disk seated on a shaft of the rotor unit and a frame arranged in the plant housing.

5. The power recovery plant as defined in claim 1, wherein the rotor unit is mounted by catching bearings effective upon inactivation of the magnetic bearing unit.

6. The power recovery plant as defined in claim 1, wherein the radial bearing comprises stacks of sheets shrunk onto a shaft of the rotor unit and a frame arranged in the plant housing.

7. A power recovery plant comprising:

a plant housing, a cryogenic gas expansion turbine, having a radially outer inlet passage, a central outlet passage and a turbine wheel driven by said gas when flowing from said inlet passage to said outlet passage, an electric generator having a rotor driven by said turbine wheel, said rotor and said turbine wheel forming a rotor unit rotating as a whole within said plant housing, said rotor unit being rotatably mounted within said plant housing by magnetic bearings, one of said magnetic bearings supporting said rotor unit radially between said turbine wheel and said rotor, and another of said magnetic bearings supporting said rotor unit on the opposite side of said rotor, said magnetic bearings and said rotor being arranged in a coherent interior space of said plant housing, said interior space enclosing a gas at a defined pressure level.

8. A power recovery plant comprising:

a plant housing, a gas expansion turbine having a radially outer inlet passage, a central outlet passage and a turbine wheel driven when gas is flowing from said inlet passage to said outlet passage, an electric generator having a rotor driven by said turbine wheel, said rotor and said turbine wheel forming a rotor unit rotating as a whole within said plant housing, said rotor unit being rotatably mounted within said plant housing by magnetic bearings, said rotor unit having an axial geometric center and an axial center of gravity, said magnetic bearings forming an active magnetic mounting of said rotor unit and being controlled by a positioning control comprising sensors and guiding said rotor unit with an axis of rotation extending through the axial geometric center of the rotor unit below a predetermined rotational speed and through the axial center of gravity above said predetermined rotational speed.

9. A power recovery plant comprising:

a plant housing comprising a turbine housing and a generator housing, a gas expansion turbine having a radially outer inlet passage, a central outlet passage and a turbine wheel driven when gas is flowing from said inlet passage to said outlet passage, an electric generator having a rotor driven by said turbine wheel, said rotor and said turbine wheel forming a rotor unit, said rotor unit being rotatably mounted as a whole within said plant housing by magnetic bearing units, said plant housing forming a resistant and gas tight pressure enclosure encompassing said rotor unit with respect to the exterior and thereby comprising a first interior space encompassing said turbine wheel and a second interior space encompassing said rotor and said magnetic bearing units, said second interior space being connected to a cooling gas circuit for circulating said cooling gas through said second interior space by supplying cooling gas via an inlet channel and removing cooling gas via an outlet channel, said cooling gas within said second interior space being kept at a determined pressure level resulting in reduced gas friction for rotating components within the second interior space.

10. The power recovery plant as defined in claim 9, wherein:

a connecting passage penetrated by the rotor unit connects the second interior space to the first interior space, the second interior space, the connecting passage and the first interior space being enclosed by the plant housing so as to be gas-tight and resistant to pressure.

11. The power recovery plant as defined in claim 9, wherein the magnetic bearing units are adapted to have a cooling gas flowing therethrough.

12. The power recovery plant as defined in claim 9, wherein the cooling gas flows through the magnetic bearing units essentially in an axial direction.

13. The power recovery plant as defined in claim 9, wherein the cooling gas is identical to the gas driving the turbine.

14. The power recovery plant as defined in claim 13, wherein the cooling gas originates from the gas flowing through the turbine.

15. The power recovery plant as defined in claim 10, wherein the cooling gas is leakage gas flowing from the first interior space into the second interior space through the connecting passage.

16. The power recovery plant as defined in claim 12, wherein external cooling gas is suppliable and removable for cooling the magnetic bearing units.

17. The power recovery plant as defined in claim 16, wherein external cooling gas flows through the magnetic bearing units in an axial direction away from the turbine.

18. The power recovery plant as defined in claim 16, wherein the external cooling gas is suppliable between the turbine wheel and the magnetic bearing unit located closest to the turbine wheel.

19. The power recovery plant as defined in claim 9, wherein the cooling gas is removable from the second interior space on a side remote from the turbine.

20. The power recovery plant as defined in claim 10, wherein a gas-flow reducing element is arranged in the connecting passage.

21. The power recovery plant as defined in claim 9, wherein the pressure in the second interior space is below an input pressure at a gas inlet of the turbine.

22. The power recovery plant as defined in claim 21, wherein the pressure in the second interior space substantially equals an output pressure at a gas outlet of the expansion turbine.

23. The power recovery plant as defined in claim 9, wherein the generator is a permanently excited synchronous generator.

24. The power recovery plant as defined in claim 23, wherein the rotor is an electrically passive rotor.

25. The power recovery plant as defined in claim 9, wherein said generator has a cooled stator.

26. The power recovery plant as defined in claim 25, wherein said stator is liquid-cooled.

27. The power recovery plant as defined in claim 9 further comprising a frequency converter connected to an output of said generator, said frequency converter producing a standardized supply voltage with a standardized supply frequency for a public power supply network.

* * * * *